United States Patent
Liu et al.

(10) Patent No.: US 12,072,184 B2
(45) Date of Patent: Aug. 27, 2024

(54) HOLE WALL THICKNESS GAUGE

(71) Applicant: CITIC DICASTAL CO., LTD., Hebei Province (CN)

(72) Inventors: Huiying Liu, Hebei Province (CN); Long Yang, Hebei Province (CN); Fafu Qin, Hebei Province (CN); Zhenyu Li, Hebei Province (CN); Zuo Xu, Hebei Province (CN); Hanqi Wu, Hebei Province (CN); Zhihua Zhu, Hebei Province (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 553 days.

(21) Appl. No.: 17/409,409

(22) Filed: Aug. 23, 2021

(65) Prior Publication Data

US 2022/0307812 A1 Sep. 29, 2022

(30) Foreign Application Priority Data

Mar. 29, 2021 (CN) .......................... 202120628235.0

(51) Int. Cl.
*G01B 5/06* (2006.01)

(52) U.S. Cl.
CPC ..................................... *G01B 5/06* (2013.01)

(58) Field of Classification Search
CPC .......... G01B 5/06; G01B 5/0002; G01B 5/08; B22D 31/002; B22D 46/00
See application file for complete search history.

(56) References Cited

U.S. PATENT DOCUMENTS

| 4,385,445 | A | * | 5/1983 | Basinger | G01B 5/06 33/803 |
| 4,977,681 | A | * | 12/1990 | Jiles | G01B 3/46 33/544.5 |
| 5,189,808 | A | * | 3/1993 | Evans | G01B 3/28 33/542 |
| 5,746,003 | A | * | 5/1998 | Baruchello | G01B 5/08 33/542 |
| 5,865,059 | A | * | 2/1999 | Alessandro | G01B 7/107 73/159 |
| 5,979,071 | A | * | 11/1999 | Kim | G01B 3/50 33/549 |
| 11,385,040 | B1 | * | 7/2022 | Gregory | G01N 21/952 |
| 2022/0307812 | A1 | * | 9/2022 | Liu | B22D 31/002 |

FOREIGN PATENT DOCUMENTS

| CN | 206862250 U | * | 1/2018 | |
| CN | 214333614 U | * | 10/2021 | G01B 5/06 |

* cited by examiner

Primary Examiner — Yaritza Guadalupe-McCall

(57) ABSTRACT

Disclosed is a hole wall thickness gauge. In the technical solution, a deburring function and a measurement function are integrated, and measurement is completed while deburring is completed. The hole wall thickness gauge is ingenious in design, flexible and high in efficiency and has a quite high practical application value.

9 Claims, 4 Drawing Sheets

HOLE WALL THICKNESS GAUGE

This patent application claims the benefit of Chinese Patent Application with Ser. No. 202120628235.0 filed on Mar. 29, 2021, which is incorporated by reference herein.

TECHNICAL FIELD

The present disclosure relates to the technical field of gauges, in particular to a hole wall thickness gauge.

BACKGROUND

For a subframe body mounting hole, an outer wall is a casting surface, and a top surface and an inner wall are machining surfaces. Due to casting deformation and errors, a machined hole has an uneven wall thickness. From a front top view of a top surface of the hole, wide and narrow edges for the wall thickness may be formed, and also burrs may be present at a joint of the casting surface and the machining surface. Here, customers require that the wide and narrow edges for the wall thickness are controlled to meet L±A and require no burrs, wherein L is a wall thickness theoretical value, A is a tolerance zone, and the wide and narrow edges of an annular band are L+A at most and L−A at least. Burrs at the joint of the casting surface and the machining surface cannot be removed easily due to their irregular shapes. Moreover, the wall thickness needs to be measured individually by a caliper, resulting in low efficiency, and there is a lack of a special tool.

SUMMARY

In view of this, the present disclosure aims to provide a hole wall thickness gauge that can integrate a deburring function and a measurement function, can complete measurement while deburring is completed, and thus saves time and is high in efficiency. To achieve the objective, the technical solution of the present disclosure is implemented as follows.

A hole wall thickness gauge includes a positioning post with a diameter less than a lower deviation of a measured hole, wherein an upper end of the positioning post is connected to a flange with a diameter greater than that of the measured hole, the other end of the flange is connected to a shaft, an upper portion of the shaft penetrates through a sleeve that is open downwards, the sleeve, the shaft, the flange and the positioning post are coaxial, grinding heads are disposed on the sleeve, a horizontal distance from an end, close to the positioning post, of each grinding head to an inner wall of the measured hole is set to be a lower deviation of a wall thickness of the measured hole, and a horizontal distance from an end, away from the positioning post, of each grinding head to the inner wall of the measured hole is set to be an upper deviation of the wall thickness of the measured hole.

In some embodiments, there are two grinding heads that are in a V shape and are disposed at a bottom of the sleeve in axial symmetry relative to the sleeve.

In some embodiments, the diameter of the positioning post is D1 which is equal to the lower deviation of the diameter D of the measured hole minus 0.02 mm.

In some embodiments, a diameter of the flange is D2, wherein D2=D+10 mm.

In some embodiments, a bearing pedestal is disposed outside the shaft, and a bearing is disposed between the bearing pedestal and the shaft.

In some embodiments, guide rails are disposed on an outer surface of the bearing pedestal, sliders that are matched with the guide rails are fixed on an inner wall of the sleeve, and the shaft can move along the guide rails in a vertical direction.

In some embodiments, limiting blocks are further disposed on the guide rails.

In some embodiments, a handle is disposed at an upper end of the shaft.

In some embodiments, grips are disposed on an outer wall of the sleeve.

Compared to the prior art, the hole wall thickness gauge of the present disclosure has the following advantages:

the present disclosure provides the hole wall thickness gauge that integrates the deburring function and the measurement function, can complete measurement while deburring is completed. The hole wall thickness gauge is ingenious in design, flexible and high in efficiency and has a quite high practical application value.

BRIEF DESCRIPTION OF THE DRAWINGS

The accompanying drawings constituting one part of the present disclosure provide a further understanding of the present disclosure, and illustrative embodiments of the present disclosure and description thereof are provided to interpret the present disclosure, but do not improperly limit the present disclosure. In accompanying drawings.

DESCRIPTION OF REFERENCE NUMERALS

Figure 1:
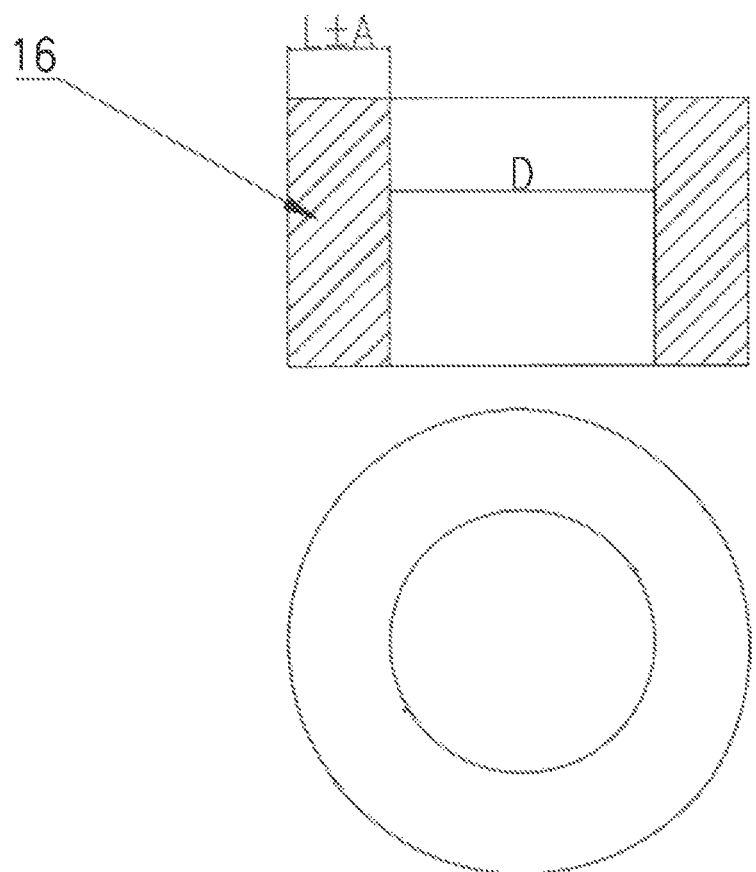
FIG. 1 is a top plane view of a measured hole of a hole wall thickness gauge of the present disclosure.
Figure 2:
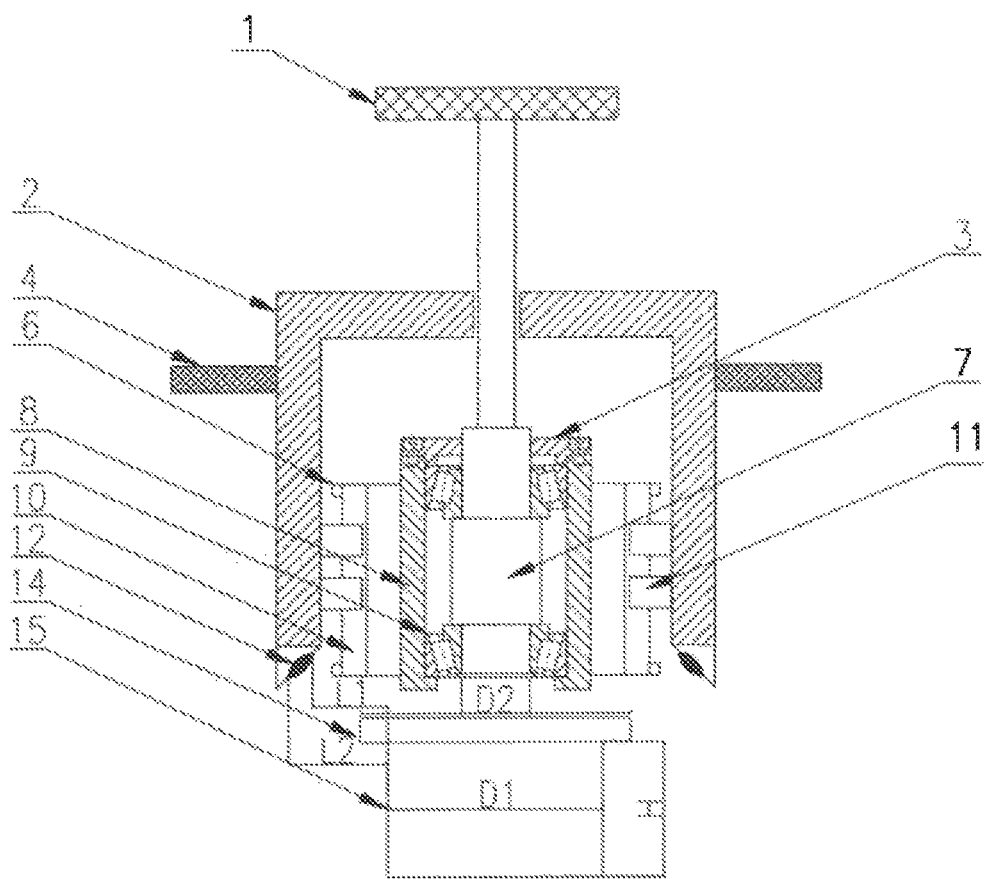
FIG. 2 is a front view of a hole wall thickness gauge of the present disclosure.

1—Handle, 2—Sleeve, 3—End cover, 4—Grip, 6—Limiting block, 7—Shaft, 8—Bearing pedestal, 9—Bearing, 10—Guide rail, 11—Slider, 12—Grinding head, 14—Flange, 15—Positioning post, 16—Measured hole.

DETAILED DESCRIPTION OF THE EMBODIMENTS

It should be noted that the embodiments of the present disclosure and features in the embodiments may be combined with each other without conflicts.

The technical solutions of the present disclosure will be clearly and comprehensively described as below by reference to the accompanying drawings in conjunction with the embodiments. Obviously, the described embodiments are only part of the embodiments of the present disclosure, and are not all of the embodiments. All other embodiments obtained by a person of ordinary skill in the art without making creative efforts all belong to the protection scope of the present disclosure.

A hole wall thickness gauge of the embodiments of the present disclosure is described in conjunction with the embodiments by reference to FIGS. 1-4 as below.

The hole wall thickness gauge includes a positioning post 15 with a diameter less than a lower deviation of a measured hole, wherein an upper end of the positioning post 15 is connected to a flange 14 with a diameter greater than that of the measured hole, the other end of the flange 14 is connected to a shaft 7, an upper portion of the shaft 7 penetrates through a sleeve 2 that is open downwards, the sleeve 2, the shaft 7, the flange 14 and the positioning post 15 are coaxial, grinding heads 12 are disposed on the sleeve 2, a horizontal distance from an end, close to the positioning post 15, of each grinding head 12 to an inner wall of the measured hole is set to be a lower deviation of a wall thickness of the measured hole, and a horizontal distance from an end, away from the positioning post 15, of each grinding head 12 to the inner wall of the measured hole is set to be an upper deviation of the wall thickness of the measured hole.

In some embodiments, there are two grinding heads 12 that are in a V shape and are disposed at a bottom of the sleeve 2 in axial symmetry relative to the sleeve 2.

In some embodiments, the diameter of the positioning post 15 is D1 which is equal to the lower deviation of the diameter D of the measured hole 16 minus 0.02 mm.

In some embodiments, a diameter of the flange 14 is D2, wherein D2=D+10 mm.

In some embodiments, a bearing pedestal 8 is disposed outside the shaft 7, and a bearing 9 is disposed between the bearing pedestal 8 and the shaft 7.

In some embodiments, guide rails 10 are disposed on an outer surface of the bearing pedestal 8, sliders that are matched with the guide rails 10 are fixed on an inner wall of the sleeve 2, and the shaft 7 can move along the guide rails 10 in a vertical direction.

In some embodiments, limiting blocks 6 are further disposed on the guide rails 10.

In some embodiments, a handle 1 is disposed at an upper end of the shaft 7.

In some embodiments, grips 4 are disposed on an outer wall of the sleeve 2.

In in some embodiments, the hole wall thickness gauge includes the handle 1, the sleeve 2, an end cover 3, the grips 4, the limiting blocks 6, the shaft 7, the bearing pedestal 8, the bearing 9, the guide rails 10, the sliders 11, the grinding heads 12, the flange 14, the positioning post 15, and other structures.

The handle 1 is fixedly connected to the shaft 7, the shaft 7 is disposed in the bearing pedestal 8, the flange 14 is fixedly connected to a tail end of the shaft 7, the flange 14 is fixedly connected to the positioning post 15, and the shaft 7, the flange 14 and the positioning post 15 are coaxial. The diameter of the positioning post 15 is D1, and D1 is equal to the lower deviation of the diameter D of the measured hole 16 minus 0.02 mm; a length H of the positioning post 15 is in a range of 10-12 mm, and the positioning post 15 is used for radial positioning of a device; and the diameter D of the measured hole 16 plus 10 mm equals the diameter D2 of the flange 14, and the flange 14 is used for axial positioning of the device.

The guide rails 10 are symmetrically disposed on the outer surface of the bearing pedestal 8, the sliders 11 that are matched with the guide rails 10 are fixed on the inner wall of the sleeve 2, and the shaft 7 can move along the guide rails 10 in the vertical direction. The limiting blocks 6 are disposed at two ends of the guide rails 10, the sleeve 2 is disposed on the guide rails 10 through the sliders 11, and the sleeve 2 can not only slide freely within a stroke along the guide rails 10, but also rotate freely around the shaft 7. The grips 4 are symmetrically disposed on the outer wall of the sleeve 2 and are configured to drive the sleeve 2 to lift and rotate manually. The grinding heads 12 are symmetrically disposed at the bottom of the sleeve 2, the grinding heads 12 are made of an elastic material and thus can deform under pressure, and the grinding heads 12 are covered with an abrasive material on surfaces and thus can grind and perform deburring on the edge of the hole wall. A horizontal distance from a right side edge of one grinding head 12 to the positioning post 15 is L1, L1=L−A, a horizontal distance from a left side edge of the grinding head 12 to the positioning post 15 is L2, L2=L+A, and a horizontal width of the grinding head 12 meets L2−L1=2A, wherein, L is a hole wall thickness theoretical value, and A is a tolerance zone of the measured hole 16.

Figure 3:
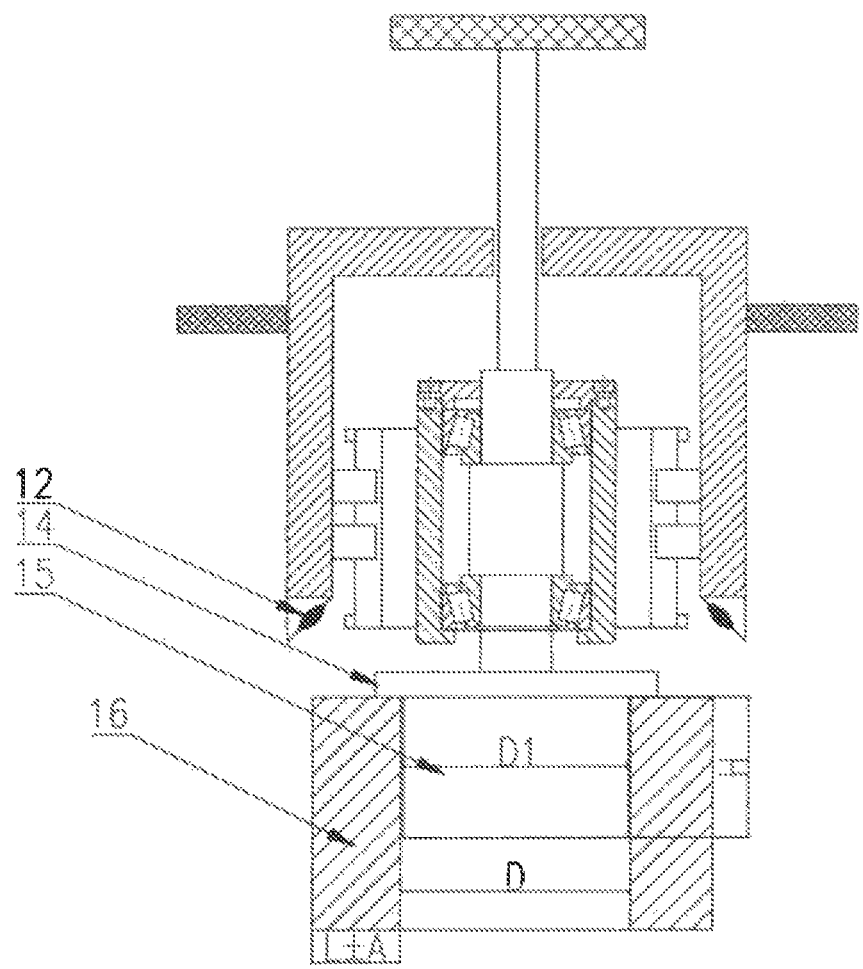
FIG. 3 is a schematic diagram of operation of a hole wall thickness gauge of the present disclosure.
Figure 4:
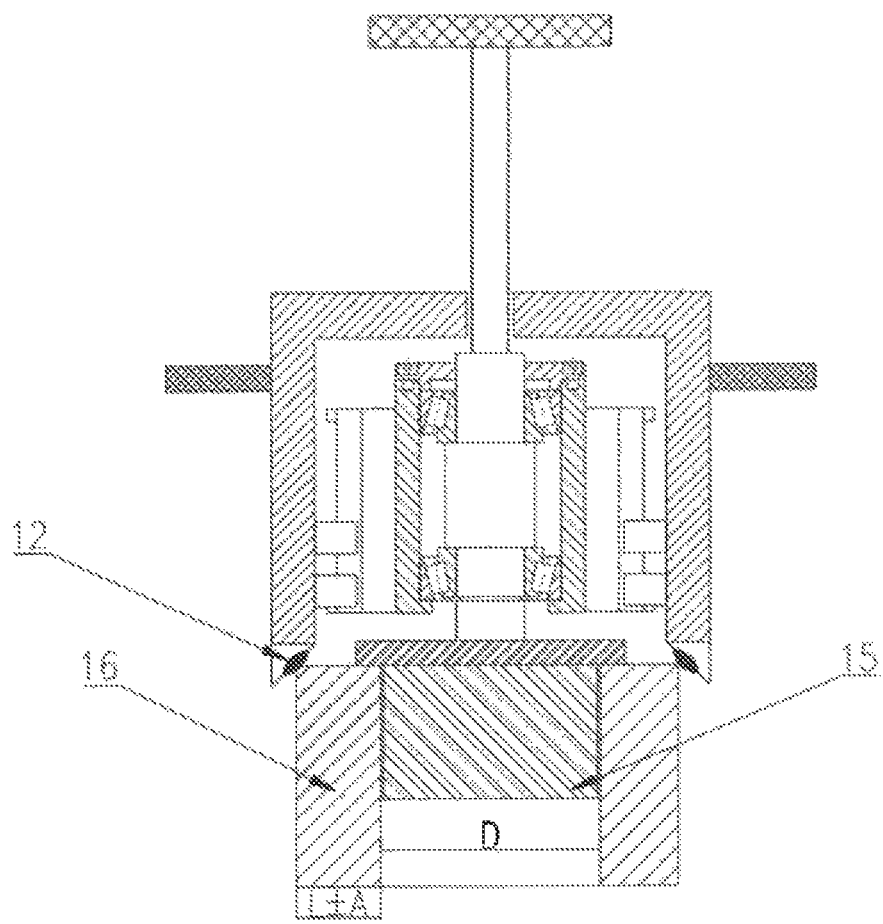
FIG. 4 is a schematic diagram of operation of a hole wall thickness gauge of the present disclosure.

The operation process of the hole wall thickness gauge is as follows: holding the handle 1 first, completely inserting the positioning post 15 into the measured hole 16 to make the lower surface of the flange 14 be attached to the upper surface of the measured hole 16 as shown in FIG. 3, then holding the grips 4 at the same time to drive the sleeve 2 to move downwards along the guide rails 10 to make the grinding heads 12 touch the edge of the outer wall of the measured hole 16, then holding the grips 4 to drive the sleeve 2 to rotate for a circle, so as to complete deburring of the edge of the outer wall of the hole. In the deburring process, the edge of the hole wall does not fall within a grinding zone of the grinding heads in case that the wall thickness of the measured hole 16 exceeds the lower deviation and thus burrs remain, the edge of the wall of the hole does not fall within the grinding zone of the grinding heads in case that the wall thickness of the measured hole 16 exceeds the upper deviation and thus burrs may also remain, accordingly the measurement of the wall thickness can be completed in the deburring process, and whether the wall thickness exceeds the upper deviation and the lower deviation can be judged by judging whether there are burrs left. When the burrs on an annular ring of the edge of the hole outer wall are all removed, the wall thickness of the hole is qualified accordingly.

Compared to the prior art, the hole wall thickness gauge of the present disclosure has the following advantages:

in the technical solution, the deburring function and the measurement function are integrated, and measurement is completed while deburring is completed. The hole wall thickness gauge is ingenious in design, flexible and high in efficiency and has a quite high practical application value.

In the description of the present invention, it should be understood that the terms "center", "longitudinal", "transverse", "front", "rear", "left", "right", "vertical", "horizontal", "top", "bottom", "inner", "outer", and the like indicate orientations or positional relationships based on the drawings. The terms are only for description convenience of the present invention and simplification of the description, but do not indicate or imply that the pointed apparatuses or elements must have specific orientations or be constructed and operated in specific orientations. Therefore, the terms should not be understood to limit the present invention.

Furthermore, the terms "first" and "second" are only for the aim of description, and cannot be understood as indicating or implying the relative importance or implicitly indicating the quantity of the indicated technical features. Thus, the features defined with "first" and "second" may explicitly or implicitly comprise one or more of these features. In the description of the present invention, "a plurality of" means at least two, e.g., two, three, etc., unless otherwise specified.

In the present invention, unless otherwise specified and defined, the terms "mounted", "joined", "connected", "fixed" and the like should be understood in a broad sense, for example, being fixedly connected, detachably connected, integrated; mechanically connected, electrically connected, mutually communicated; directly connected, indirectly connected by a medium, communication of interiors of two components or interaction of two components. A person of ordinary skill in the art could understand the specific meanings of the above terms in the present invention according to specific circumstances.

The foregoing descriptions are merely preferred embodiments of the present invention, but are not intended to limit the present invention. Any modification, equivalent substitution, improvement and the like made within the spirit and principle of the present invention shall fall within the protection scope of the present invention.

What is claimed is:

1. A hole wall thickness gauge, comprising a positioning post with a diameter less than a lower deviation of a measured hole, wherein an upper end of the positioning post is connected to a flange with a diameter greater than that of the measured hole, the other end of the flange is connected to a shaft, an upper portion of the shaft penetrates through a sleeve that is open downwards, the sleeve, the shaft, the flange and the positioning post are coaxial, grinding heads are disposed on the sleeve, a horizontal distance from an end, close to the positioning post, of each grinding head to an inner wall of the measured hole is set to be a lower deviation of a wall thickness of the measured hole, and a horizontal distance from an end, away from the positioning post, of each grinding head to the inner wall of the measured hole is set to be an upper deviation of the wall thickness of the measured hole.

2. The hole wall thickness gauge according to claim 1, wherein there are two grinding heads that are in a V shape and are disposed at a bottom of the sleeve in axial symmetry relative to the sleeve.

3. The hole wall thickness gauge according to claim 1, wherein the diameter of the positioning post is D1 which is equal to the lower deviation of the diameter D of the measured hole minus 0.02 mm.

4. The hole wall thickness gauge according to claim 3, wherein a diameter of the flange is D2, D2=D+10 mm.

5. The hole wall thickness gauge according to claim 1, wherein a bearing pedestal is disposed outside the shaft, and a bearing is disposed between the bearing pedestal and the shaft.

6. The hole wall thickness gauge according to claim 5, wherein guide rails are disposed on an outer surface of the bearing pedestal, sliders that are matched with the guide rails are fixed on an inner wall of the sleeve, and the shaft can move along the guide rails in a vertical direction.

7. The hole wall thickness gauge according to claim 6, wherein limiting blocks are further disposed on the guide rails.

8. The hole wall thickness gauge according to claim 1, wherein a handle is disposed at an upper end of the shaft.

9. The hole wall thickness gauge according to claim 1, wherein grips are disposed on an outer wall of the sleeve.

* * * * *